(12) United States Patent
Shin et al.

(10) Patent No.: US 9,788,207 B2
(45) Date of Patent: *Oct. 10, 2017

(54) METHOD, SYSTEM AND APPARATUS FOR ENHANCING SECURITY OF BEACON DEVICE

(71) Applicant: SK PLANET CO., LTD., Gyeonggi-do (KR)

(72) Inventors: Chul Yong Shin, Seoul (KR); Jae Hyung Huh, Gyeonggi-do (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/391,558

(22) Filed: Dec. 27, 2016

(65) Prior Publication Data
US 2017/0111795 A1    Apr. 20, 2017

Related U.S. Application Data

(62) Division of application No. 14/539,569, filed on Nov. 12, 2014.

(30) Foreign Application Priority Data

May 27, 2014  (KR) ........................ 10-2014-0063519

(51) Int. Cl.
*G06F 7/04*    (2006.01)
*H04W 12/06*   (2009.01)
(Continued)

(52) U.S. Cl.
CPC ......... *H04W 12/06* (2013.01); *H04L 63/0846* (2013.01); *H04W 4/008* (2013.01); *H04W 40/244* (2013.01); *H04L 63/0838* (2013.01)

(58) Field of Classification Search
CPC ..... H04W 12/06; H04W 12/04; H04W 4/008; H04L 63/083; H04L 63/0846; H04L 63/0853; H04L 63/105
(Continued)

(56) References Cited

U.S. PATENT DOCUMENTS

| 8,781,502 | B1* | 7/2014 | Middleton | ......... | G06Q 30/0261 |
| | | | | | 455/456.3 |
| 2014/0249928 | A1* | 9/2014 | McMillan | .......... | G06Q 30/0267 |
| | | | | | 705/14.64 |

(Continued)

FOREIGN PATENT DOCUMENTS

KR    10-2013-0055501    5/2013

OTHER PUBLICATIONS

Kara Kamenec, "How Apple's iBeacon Could Upend Retail Shopping," Oct. 24, 2013, retrieved Jun. 25, 2016.

*Primary Examiner* — Samson Lemma
(74) *Attorney, Agent, or Firm* — Fenwick & West LLP

(57) ABSTRACT

A method, system and apparatus for enhancing the security of a beacon device are herein disclosed. A service device includes a service communication unit and a service control unit. The service communication unit communicates with at least one terminal and a beacon device, and transmits and receives data required to enhance the security of the beacon device. The service control unit performs control so as to receive pieces of identification information from the terminal and the beacon device, to check the received pieces of identification information and then perform validation based on the times at which the pieces of identification information have been generated and whether authentication keys match each other, to extract service information in response to the result of the validation, and to transmit the extracted service information to the terminal.

2 Claims, 8 Drawing Sheets

(51) Int. Cl.
*H04L 29/06* (2006.01)
*H04W 4/00* (2009.01)
*H04W 40/24* (2009.01)

(58) Field of Classification Search
USPC .................................................. 726/7, 29
See application file for complete search history.

(56) References Cited

U.S. PATENT DOCUMENTS

| | | | | |
|---|---|---|---|---|
| 2014/0324616 | A1* | 10/2014 | Proietti | G06Q 30/0601 705/26.1 |
| 2015/0036823 | A1* | 2/2015 | Graube | H04W 12/02 380/274 |
| 2015/0140982 | A1* | 5/2015 | Postrel | H04W 4/008 455/418 |
| 2015/0287045 | A1* | 10/2015 | Brown | G06Q 30/018 705/14.4 |
| 2016/0014546 | A1* | 1/2016 | Huh | H04W 4/02 455/41.2 |

* cited by examiner

METHOD, SYSTEM AND APPARATUS FOR ENHANCING SECURITY OF BEACON DEVICE

CROSS-REFERENCE TO RELATED APPLICATION

This application is a Divisional of U.S. application Ser. No. 14/539,569 filed on Nov. 12, 2014, which claims the benefit of Korean Patent Application No. 10-2014-0063519, filed May 27, 2014, which is hereby incorporated by reference herein in its entirety.

BACKGROUND

1. Technical Field

The present disclosure relates generally to a method, system and apparatus for enhancing the security of a beacon device, and more particularly, to a method, system and apparatus for enhancing the security of a beacon device, which are capable of dynamically changing identification information generated by a beacon device, thereby allowing service to be used only in an application of an authenticated terminal.

2. Description of the Related Art

With the development of mobile communication networks and the advancement of terminal specifications, mobile communication terminals have become the necessities of people today and are evolving into total entertainment devices, beyond the scope of conventional simple communication devices or information provision devices.

Such mobile communication terminals have not only the function of performing communication over a mobile communication network but also the function of performing short-range wireless communication, such as Near Field Communication (NFC), Bluetooth communication, etc.

However, NFC has a short communication distance, and requires a separate wireless chip for communication. In contrast, Bluetooth communication has a relatively long communication distance, and most terminals have the function of performing Bluetooth communication. Accordingly, various communication services using the function of performing Bluetooth communication have been being developed.

Furthermore, a service scheme for providing various types of information to the mobile communication terminal of a user by means of a beacon via Bluetooth communication is being developed. In this case, the mobile communication terminal is used to receive corresponding beacon identification from the beacon and then obtain various types of information from this beacon identification.

However, a problem arises in that identification information transmitted by a beacon device uses a fixed value determined based on a rule, and therefore the unauthorized use of service using the beacon device by an unauthorized terminal may be possible when a specific application is executed after the unauthorized terminal has received a signal from the beacon device.

SUMMARY

In order to overcome the problem in which identification information transmitted by a beacon device uses a fixed value determined based on a rule and therefore the unauthorized use of service using the beacon device by an unauthorized terminal may be possible when a specific application is executed after the unauthorized terminal has received a signal from the beacon device, at least one embodiment of the present invention is intended to provide a method, system and apparatus for enhancing the security of a beacon device, which are capable of dynamically changing identification information generated by the beacon device, thereby allowing the service to be used only in an application of an authenticated terminal.

In accordance with an aspect of the present invention, there is provided a service device, including a service communication unit configured to communicate with at least one terminal and a beacon device, and to transmit and receive data required to enhance the security of the beacon device; and a service control unit configured to perform control so as to receive pieces of identification information from the terminal and the beacon device, to check the received pieces of identification information and then perform validation based on the times at which the pieces of identification information have been generated and whether authentication keys match each other, to extract service information in response to the result of the validation, and to transmit the extracted service information to the terminal.

The service device may further include a service storage unit configured to store the identification information received from the beacon device and service information corresponding to the identification information.

In the service device, the service information may include at least one of current location information, coupon information, discount information, and event information related to a corresponding store.

In the service device, the service control unit may be configured to determine whether the identification information received from the beacon device matches the identification information received from the terminal and perform the validation by taking into account the result of the determination.

In accordance with another aspect of the present invention, there is provided a beacon device, including a communication module configured to transmit a beacon signal to at least one terminal via Bluetooth Low Energy (BLE), and to communicate with a service device and transmit and receive data required to enhance the security of a beacon device; and a control module configured to perform control so as to check an authentication key and current time information to enhance the security, to generate identification information using the authentication key and the current time information, and to transmit the generated identification information to the terminal in response to a request signal received from the terminal.

In the beacon device, the control module may be further configured to perform an operation on the authentication key and the time information, thereby generating the identification information at predetermined time intervals.

In accordance with still another aspect of the present invention, there is provided a system for enhancing the security of a beacon device, including a beacon device configured to check an authentication key and current time information in order to enhance the security of the beacon device, to generate identification information using the authentication key and the current time information, and to transmit the generated identification information to at least one terminal and a service device in response to a request signal received from the terminal; the terminal configured to receive the identification information from the beacon device, to transmit the received identification information to the service device, to receive service information related to the identification information from the service device by taking into account the result of the validation of the identification information, and to provide the received service information; and the service device configured to receive pieces of identification information from the terminal and the beacon device, to check the received pieces of identification information and perform the validation of the pieces of identification information based on the times at which the pieces of identification information have been generated and whether the authentication keys match each other, to extract service information in response to the result of the validation, and to transmit the extracted service information to the terminal.

In accordance with still another aspect of the present invention, there is provided a method of enhancing the security of a beacon device, including checking, by a beacon device, an authentication key and current time information; generating, by the beacon device, identification information using the authentication key and the current time information; and transmitting, by the beacon device, the generated identification information to at least one terminal and a service device in response to a request signal received from the terminal.

The method of enhancing the security of a beacon device may further include transmitting, by the beacon device, the identification information generated using the authentication key and the current time information to the service device after generating the identification information.

In accordance with still another aspect of the present invention, there is provided a method of enhancing the security of a beacon device, including receiving, by a service device, identification information from at least one terminal; checking, by the service device, the received identification information, and performing, by the service device, the validation of the identification information based on the times at which pieces of identification information have been generated and whether the authentication keys match each other; extracting, by the service device, at least one piece of service information in response to the result of the validation; and transmitting, by the service device, the extracted service information to the terminal.

The method of enhancing the security of a beacon device may further include, before receiving the identification information, receiving, by the service device, identification information from the beacon device; and storing, by the service device, the received identification information.

In accordance with still another aspect of the present invention, there is provided a computer-readable storage medium having stored therein computer-readable program instructions that, when executed by a computer, cause the computer to check an authentication key and current time information, to generate identification information using the authentication key and the current time information, and to transmit the generated identification information to at least one terminal and a service device in response to a request signal received from the terminal.

In accordance with yet another aspect of the present invention, there is provided a computer-readable storage medium having stored therein computer-readable program instructions that, when executed by a computer, cause the computer to receive identification information from at least one terminal; to check the received identification information, and perform validation based on the times at which pieces of identification information have been generated and whether authentication keys match each other; to extract at least one piece of service information in response to the result of the validation; and to transmit the extracted service information to the terminal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
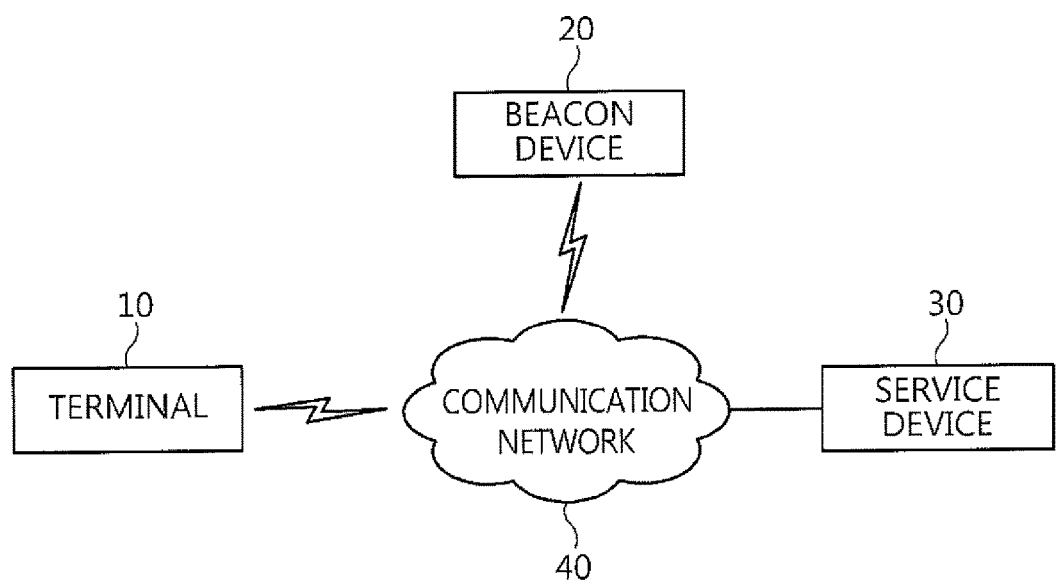
FIG. 1 is a diagram illustrating the configuration of a system for enhancing the security of a beacon device according to an embodiment of the present invention.

Embodiments of the present invention will be described in detail below with reference to the accompanying drawings. Detailed descriptions of well-known functions and configurations that would make the gist of the present invention obscure will be omitted. Furthermore, it should be noted that the same elements will be designated by the same reference numerals throughout the accompanying drawings as much as possible.

The terms and words that are used in the present specification and the claims to be described below should not be interpreted as having common and dictionary meanings, but should be interpreted as having meanings and concepts in accordance with the technical spirit of the present invention based on the principle in which an inventor can appropriately define the concepts of terms in order to describe his or her invention in the most appropriate way. Accordingly, since the embodiments described herein and the configurations illustrated in the accompanying drawings correspond merely to embodiments of the present invention and do not represent the overall technical spirit of the present invention, it should be appreciated that various equivalents and modifications that may replace the configurations at the time when the present application is filed.

Embodiments of the present invention will be described in detail below with reference to the accompanying drawings. The following detailed description given below along with the accompanying drawings is intended to describe exemplary embodiments of the present invention, but is not intended to represent the only embodiments in which the present invention can be implemented. The following detailed description includes any specific details to provide the better understanding of the present invention. However, it will be apparent to those having ordinary knowledge in the technical field to which the present invention pertains that the present invention may be practiced without those specific details.

In some cases, well-known structures and components may be omitted or illustrated in the form of blocks of block diagrams with a focus on the core functions of the structures and the components in order to avoid making the concept of the present invention obvious.

Throughout the specification, when any part is described as "comprising" or "including" any component, this means that the part does not exclude any other component but includes any other component unless described otherwise. The terms "part," "device" and "module" described in the specification means a unit for processing at least one function or operation, and may be implemented as hardware, software, or combinations of the hardware and the software. Furthermore, "a" or "an," "one," "the," and similar related terms may be used to mean including singular and plural expressions in the context of the description of the present invention (particularly, in the context of the following claims) unless indicated otherwise or clearly contradicted by the context.

In addition to the above-described terms, the specific terms used in the following description have been provided to aid in the understanding of the present invention. These specific terms may be replaced with other terms without departing from the scope of the technical spirit of the present invention.

Although terminals according to embodiments of the present invention will be described below by using a mobile communication terminal capable of connecting to a communication network and providing the service of checking the state of a beacon device as a representative example, the terminals are not limited to the mobile communication terminal, but may be various terminals, such as all information communication devices, a multimedia terminal, a wired terminal, a fixed terminal and an Internet Protocol (IP) terminal. Furthermore, when the terminal is a mobile terminal having various mobile communication specifications, such as a mobile phone, a Portable Multimedia Player (PMP), a Mobile Internet Device (MID), a smartphone, a desktop, a tablet PC, a notebook, a netbook or an information communication device, the terminal may be utilized advantageously.

Furthermore, beacon technology applied to the mobile communication terminals according to the embodiments of the present invention is data communication technology using Bluetooth Low Energy (BLE). The beacon technology includes a Bluetooth function that acts as a precise GPS. Although NFC can be used within a limited distance of 10 cm, beacon technology can be used to perform measurement within a range from 5 to 49 cm, and thus the range of applications of the beacon technology is significantly broad. The beacon technology does not require that a smartphone is brought into contact with a reader and then tags the reader, unlike NFC, data can be transferred even when the smartphone passes by a place where a beacon has been installed, and a detailed movement of a location can be read within a building and then customized data can be transferred.

FIG. 1 is a diagram illustrating the configuration of a system 100 for enhancing the security of a beacon device according to an embodiment of the present invention.

Referring to FIG. 1, the system 100 for enhancing the security of a beacon device according to this embodiment of the present invention includes a terminal 10, a beacon device 20, a service device 30, and a communication network 40.

At least one processor mounted on the terminal 10, the beacon device 20 and/or the service device 30 according to this embodiment of the present invention may process program instructions for executing a method according to an embodiment of the present invention. In an implementation, the processor may be a single-threaded processor. In another implementation, the processor may be a multi-threaded processor. Furthermore, the processor may process instructions stored in memory or storage.

The communication network 40 performs a series of data transmission and reception operations in order to perform data transmission and information exchange among the terminal 10, the beacon device 20 and the service device 30. In particular, the communication network 40 may include various types of communication networks, for example: wireless communication networks, such as a Wireless Local Area Network (WLAN), a Wi-Fi network, a Wireless Broadband (WiBro) network, a World interoperability for Microwave Access (WiMAX) network and a High-Speed Downlink Packet Access (HSDPA) network; and wired communication networks, such as an Ethernet network, x Digital Subscriber Lines (xDSL) (an Asymmetric Digital Subscriber Line (ADSL) and a Very-high-bit-rate Digital Subscriber Line (VDSL)) network, a Hybrid Fiber Coax (HFC) network, a Fiber-To-The-Curb (FTTC) network and a Fiber-To-The-Home (FTTH) network. Meanwhile, the communication network 40 is not limited to the above-described communication networks, but may include other types of communication networks that have been currently well known or will be developed in the future, in addition to the above-described communication networks.

The terminal 10 communicates with the beacon device 20 and the service device 30 over the communication network 40, and transmits and receives data for enhancing the security of the beacon device 20. In particular, the terminal 10 according to this embodiment of the present invention receives identification information from the beacon device 20. Furthermore, the terminal 10 transmits the received identification information to the service device 30. In this case, the identification information may be information generated through the combination of an authentication key and time information. The authentication key may correspond to key information that has been set differently for each beacon device. The time information may be generated at predetermined regular time intervals.

The terminal 10 receives service information related to the identification information from the service device 30 by taking into account the result of the validation of the identification information. Thereafter, the terminal 10 provides the service information received from the service device 30. In this case, the service information includes at least one of current location information, coupon information, discount information, and event information related to a corresponding store.

Furthermore, the terminal 10 receives a beacon signal from the beacon device 20, analyzes the beacon signal, and then extracts beacon identification information. Thereafter, the terminal 10 transmits the extracted beacon identification information to the service device 30. In this case, the terminal 10 may have stored user information. This user information includes at least one of the user name and terminal identification information of the terminal 10, For example, the terminal identification information may include at least one of an International Mobile Station Equipment Identity (IMEI), an Electronic Serial Number (ESN) and a Mobile Identification Number (MDN).

The beacon device 20 functions to emit a beacon signal via wireless communication in order to enable the terminal 10 to measure a location. More specifically, the beacon device 20 may emit a beacon signal using short-range wireless communication. In an embodiment, the beacon device 20 may emit a beacon signal using BLE. However, the beacon device 20 is not limited thereto, and may emit a beacon signal using Radio-Frequency Identification (RFID), ZigBee, or Near Field Communication (NFC).

The beacon signal emitted by the beacon device 20 includes beacon identification information for the identification of the beacon device 20. The beacon identification information included in the beacon signal may include at least one of the Universally Unique IDentifier (UUID) of the beacon device 20, a major adapted to be indicative of a group of beacon devices, and a minor used to identify a specific beacon device in the group of beacon devices.

In particular, the beacon device 20 according to an embodiment of the present invention communicates with the terminal 10 and the service device 30 over the communication network 40, and transmits and receives data for enhancing the security of the beacon device 20. In this case, the beacon device 20 checks an authentication key and current time information in order to enhance the security of the beacon device 20. Thereafter, the beacon device 20 generates identification information through the combination of the authentication key and the current time information. In this case, the beacon device 20 performs an operation on the authentication key and the time information, thereby generating identification information at a predetermined time intervals.

The beacon device 20 transmits the identification information to the terminal 10 and the service device 30 in response to a request signal received from the terminal 10.

The service device 30 communicates with the terminal 10 and the beacon device 20 over the communication network 40, and transmits and receives data applied to the enhancement of the security of the beacon device 20. In particular, the service device 30 according to an embodiment of the present invention receives the identification information from the beacon device 20.

The service device 30 receives the identification information from the terminal 10, and performs the validation of the identification information received from the terminal 10 and the identification information received from the beacon device 20. In this case, the service device 30 determines whether the identification information received from the beacon device 20 matches the identification information received from the terminal 10, and performs the validation by taking into account the result of the determination. That is, the service device 30 may check the received identification information, and may perform the validation based on the time at which the identification information has been generated and whether authentication keys match each other.

The service device 30 extracts service information by taking into account the result of the validation. In this case, the service information includes at least one of current location information, coupon information, discount information, and event information related to a corresponding store. Thereafter, the service device 30 transmits the extracted service information to the terminal 10.

Accordingly, in accordance with this embodiment of the present invention, service can be used only in an application of an authenticated terminal through the dynamic assignment of identification information to a beacon device, thereby preventing the unauthorized use of the beacon device. Furthermore, the checking of the identification information of the beacon device is performed using a BLE beacon signal, and thus resources required for the checking of the identification information can be reduced on behalf of the terminal and also logic required for the extraction of information applied to the service can be simplified on behalf of the service device.

A process of enhancing the security of the beacon device according to an embodiment of the present invention is described in detail with reference to FIGS. 2 to 9.

Figure 2:
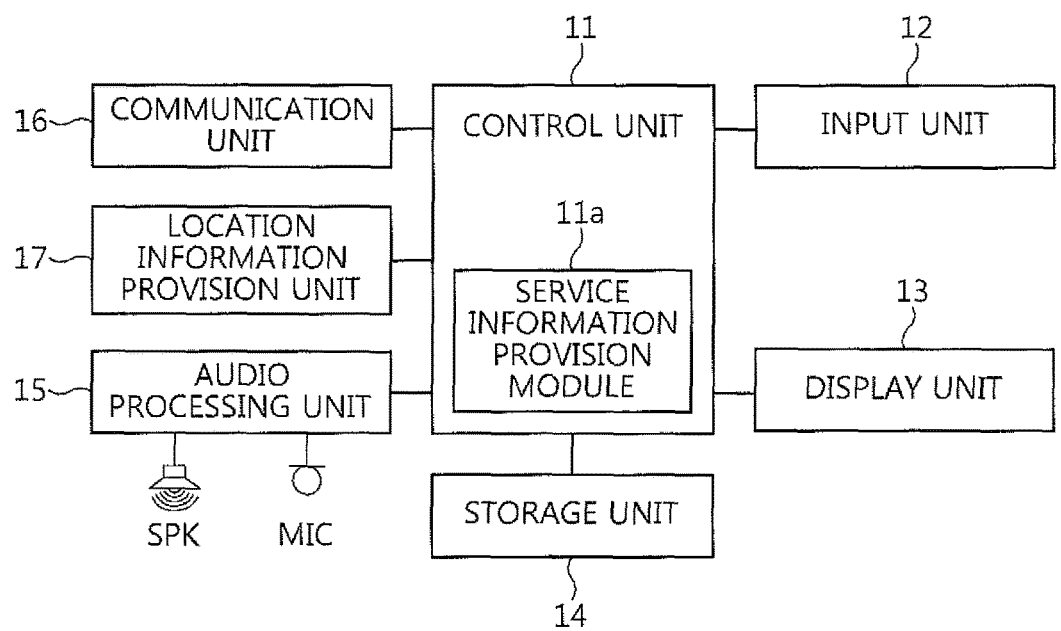
FIG. 2 is a block diagram illustrating the configuration of a terminal according to an embodiment of the present invention.

FIG. 2 is a block diagram illustrating the configuration of a terminal 10 according to an embodiment of the present invention.

Referring to FIG. 2, the terminal 10 according to this embodiment of the present invention includes a control unit 11, an input unit 12, a display unit 13, a storage unit 14, an audio processing unit 15, a communication unit 16, and a location information provision unit 17. In this case, the control unit 11 includes a service information provision module 11a.

The input unit 12 receives various types of information, such as number information and character information, and transfers input signals related to the setting of various types of functions and the control of the functions of the terminal 10 to the control unit 11. Furthermore, the input unit 12 may include at least one of a keypad and a touchpad for generating input signals in response to touches or manual operations of a user. In this case, the input unit 12 may be configured to form a single touch panel or touch screen along with the display unit 13, and thus may perform input and display functions at the same time. Furthermore, all types of input means that will be developed in the future, together with input devices, such as a keyboard, a keypad, a mouse and a joy stick, may be used as the input unit 12. In particular, the input unit 12 according to this embodiment of the present invention detects an input signal for user authentication, an input signal for connection to the beacon device 20, and an input signal for the input of information that enhances the security of the beacon device 20 from an user, and then transfers the detected input signals to the control unit 11.

The display unit 13 displays a series of pieces of information about operation states, operation results, etc. that are generated during the performance of the functions of the terminal 10. Furthermore, the display unit 13 may display the menu of the terminal 10, user data input by a user, etc. In this case, the display unit 13 may include a Liquid Crystal Display (LCD), a Thin-Film-Transistor Liquid Crystal Display (TFT-LCD), a Light Emitting Diode (LED), an Organic Light-Emitting Diode (OLED), an Active-Matrix Organic Light-Emitting Diode (AMOLED), a retina display, a flexible display, a three-dimensional (3D) display, etc. In this case, when the display unit 13 is configured in the form of a touch screen, the display unit 13 may perform some or all of the functions of the input unit 12. In particular, the display unit 13 according to this embodiment of the present invention outputs a screen for user authentication, a screen for the provision of service information, etc.

The storage unit 14 is a device for storing data. The storage unit 14 includes a main memory unit and an auxiliary memory unit, and stores application programs required to operate the functions of the terminal 10. This storage unit 14 may basically include a program area and a data area. In this case, when the terminal 10 activates respective functions in response to requests from a user, the terminal 10 executes corresponding application programs under the control of the control unit 11, and then provides the functions. In particular, the storage unit 14 according to this embodiment of the present invention stores an OS for the booting of the terminal 10, a program for user authentication, a program for the checking of the beacon device 20, a program for the checking of service information, etc. Furthermore, the storage unit 14 stores user information, identification information, service information, information about a beacon state, etc. In this case, the identification information includes at least one of a UUID, beacon group information, and identification information or a member ID in a beacon group. Meanwhile, the user information includes at least one of a user name and terminal identification information, and the information about a beacon state includes one or more of the normal operation information, communication state information, operating system (OS) information, upgrade information and power information of the beacon device 20. The service information includes at least one of current location information, coupon information, discount information, and event information related to a corresponding store.

The audio processing unit 15 functions to transfer an audio signal, input from a speaker (SPK) or a microphone (MIC) for playing and outputting an audio signal, to the control unit 11. This audio processing unit 15 may convert an analog-type audio signal, input via the microphone, into a digital-type signal, and then may transfer the digital-type signal to the control unit 11. Furthermore, the audio processing unit 15 may convert a digital-type audio signal, output from the control unit 11, into an analog-type signal, and then may output the analog-type signal via the speaker. In particular, the audio processing unit 15 according to this embodiment of the present invention outputs an effect sound or a running sound that is generated in the process of providing information for enhancing the security of the beacon device 20.

The communication unit 16 functions to transmit and receive data for enhancing the security of the beacon device 20 over the communication network 40. In this case, the communication unit 16 includes a Radio Frequency (RF) transmission means for up-converting the frequency of a signal to be transmitted and also amplifying the signal, and an RF reception means for performing low-noise amplification on a signal to be received and also down-converting the frequency of the signal. This communication unit 16 may include at least one of a wireless communication module (not illustrated) and a wired communication module (not illustrated). Furthermore, the wireless communication module is configured to transmit and receive data in accordance with a wireless communication method. The wireless communication module may transmit and receive data to and from the service device 30 using any one of a wireless network communication module, a wireless LAN communication module and a wireless Personal Area Network (PAN) communication module when the terminal 10 uses wireless communication. Furthermore, the wired communication module is configured to transmit and receive data over a wired connection. The wired communication module may be connected to the communication network 40 over a wired connection, and then may transmit and receive data to and from the service device 30. In particular, the communication unit 16 according to this embodiment of the present invention communicates with the beacon device 20 and the service device 30, and then transmits and receives data. In this case, the communication unit 16 receives a beacon signal using BLE.

Under the control of the control unit 11, the location information provision unit 17 receives Global Positioning System (GPS) signals from one or more GPS satellites, determines current location information, such as the latitude and longitude of the terminal 10, and then transmits the location information to the control unit 11. Since an error may occur in the case of using only signals received from the GPS satellites, the location information provision unit 17 may use round trip delay information, pilot phase file information, etc. transmitted from a base station, together with the GPS signals, in order to acquire accurate location information. In this case, the base station performs two roles. One role is to relay the transmission of data between a communication center and the terminal 10, and the other role is to transmit data used to determine the location of the terminal 10, that is, the location of the user. Accordingly, the location information provision unit 17 may determine the location of the corresponding terminal 10 through the reception of the above-described location information, or may determine the current location information of the terminal 10 through the use of trigonometry in which location information is received from three or more base stations and then the precise location of the terminal 10 is determined, or the like.

The location information provision unit 17 may measure the location information of the terminal 10 using a BLE method and an NFC tag method. That is, the location information provision unit 17 may determine the location of a user indoors using an Indoor Positioning System (IPS), and may determine minute changes in the location of the user in a building using the IPS. Since this IPS is easily applied to most offline stores and real life, the range of application thereof is very broad. In particular, the location of the user may be determined within a range from 5 to 49 cm using a data communication technology utilizing BLE that belongs to IPS service. Furthermore, the location information provision unit 17 may check location information using an NFC method. The NFC method is one type of wireless tag RFID technology, and is a contactless communication method using a frequency band of 13.56 MHz. Since the NFC method has a short communication distance, it is a short-range communication method having relatively excellent security.

The control unit 11 may be an OS and a process device configured to drive individual components. In particular, the control unit 11 according to this embodiment of the present invention receives identification information from the beacon device 20. Furthermore, the control unit 11 transfers the received identification information to the service device 30.

Thereafter, the control unit 11 receives service information related to the identification information from the service device 30 by taking into account the result of the validation of the identification information. Thereafter, the control unit 11 provides service information received from the service device 30. In this case, the service information includes at least one of current location information, coupon information, discount information, and event information related to a corresponding store.

Figure 3:
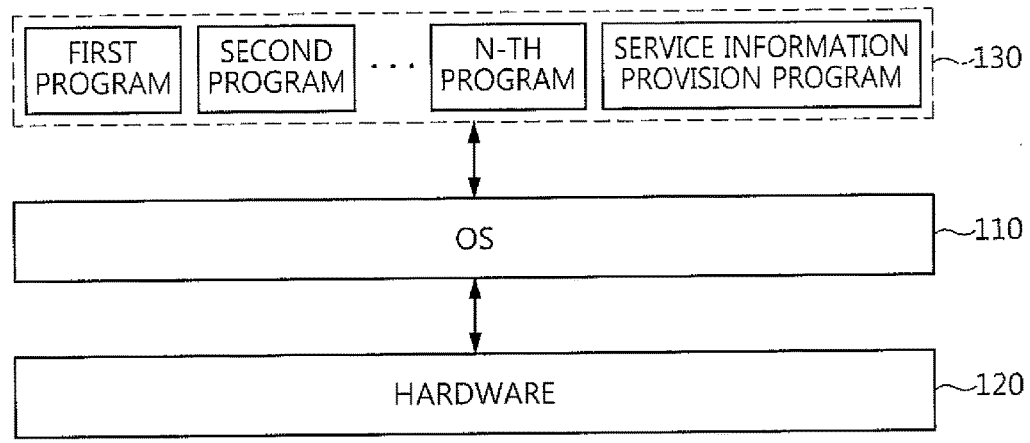
FIG. 3 is a diagram illustrating the structure of the platform of the terminal according to an embodiment of the present invention.

FIG. 3 is a diagram illustrating the structure of the platform of a terminal according to an embodiment of the present invention.

Referring to FIG. 3, the structure of the platform of the terminal 10 may include hardware 120, an OS 110, and an application 130.

The hardware 120 refers to a physical environment that includes a central processing device (CPU), a short-range wireless communication chip configured to receive a beacon signal, and a communication chip configured to connect to the communication network 40, which constitute the terminal 10.

The OS 110 controls the hardware 120, and is responsible for the overall operation of the terminal 10. The OS 110 may be generally installed by the manufacturer of the terminal 10 or a mobile communication service provider. Furthermore, the OS 110 provides an Application Programming Interface (API) that can control the hardware 120 in order to support the application 130.

The application 130 may include one or more programs operating on the OS 110, and may include a service information provision program. More specifically, the application 130 may control the hardware 120 using the interface API provided by the OS 110. The service information provision program included in the application 130 performs the same operation as the control unit 11 of the terminal 10 described above with reference to FIGS. 1 to 2. Furthermore, the service information provision program included in the application 130 may receive service information from the service device 30 using the interface API provided by the OS 110, and may output the received service information.

Figure 4:
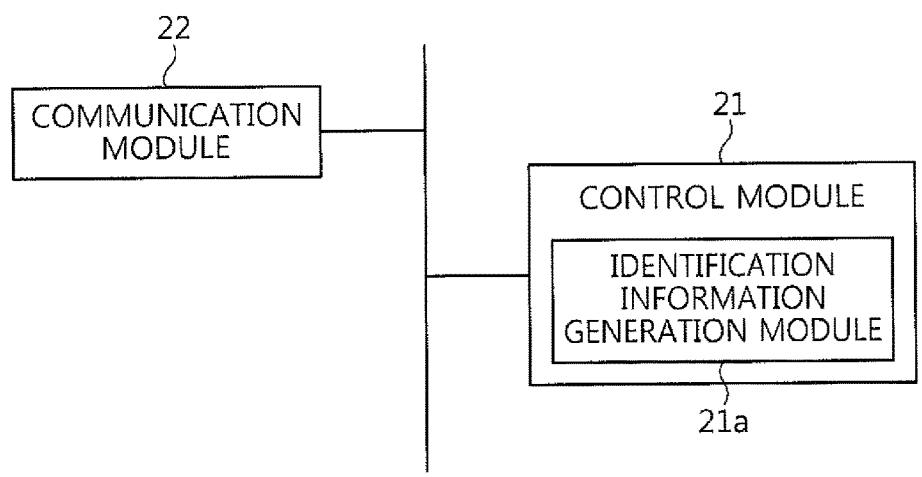
FIG. 4 is a block diagram illustrating the configuration of a beacon device according to an embodiment of the present invention.

FIG. 4 is a block diagram illustrating the configuration of a beacon device 20 according to an embodiment of the present invention.

Referring to FIG. 4, the beacon device 20 according to this embodiment of the present invention includes a control module 21 and a communication module 22.

The communication module 22 communicates with the terminal 10 and the service device 30, and transmits and receives data required to enhance the security of the beacon device 20. In this case, the communication module 22 is equipped with a Wi-Fi module, and thus may communicate with the terminal 10.

The control module 21 may be the OS of the beacon device 20 and a process device configured to drive individual components. In particular, the control module 21 according to this embodiment of the present invention checks an authentication key and current time information in order to enhance security. Furthermore, the control module 21 generates identification information using the authentication key and the current time information. Furthermore, the control module 21 performs an operation on the authentication key and the time information, and then generates the identification information at predetermined time intervals. In this case, the identification information may be information generated through the combination of the authentication key and the time information. The authentication key may correspond to key information that has been set differently for each beacon device. The time information may be generated at predetermined regular time intervals. For example, the identification information may include a One-Time Password (OTP). A user authentication method using a one-time password of random numbers that are randomly generated is applied to the identification information. That is, the control module 21 generates a one-time password. The control module 21 may automatically generate a different password of a specific number of digits at predetermined time intervals.

The control module 21 transmits identification information, generated in response to a request signal received from the terminal 10, to the terminal 10 and the service device 30. In this case, the control module 21 transmits the identification information to the terminal 10 via short-range wireless communication.

Figure 5:
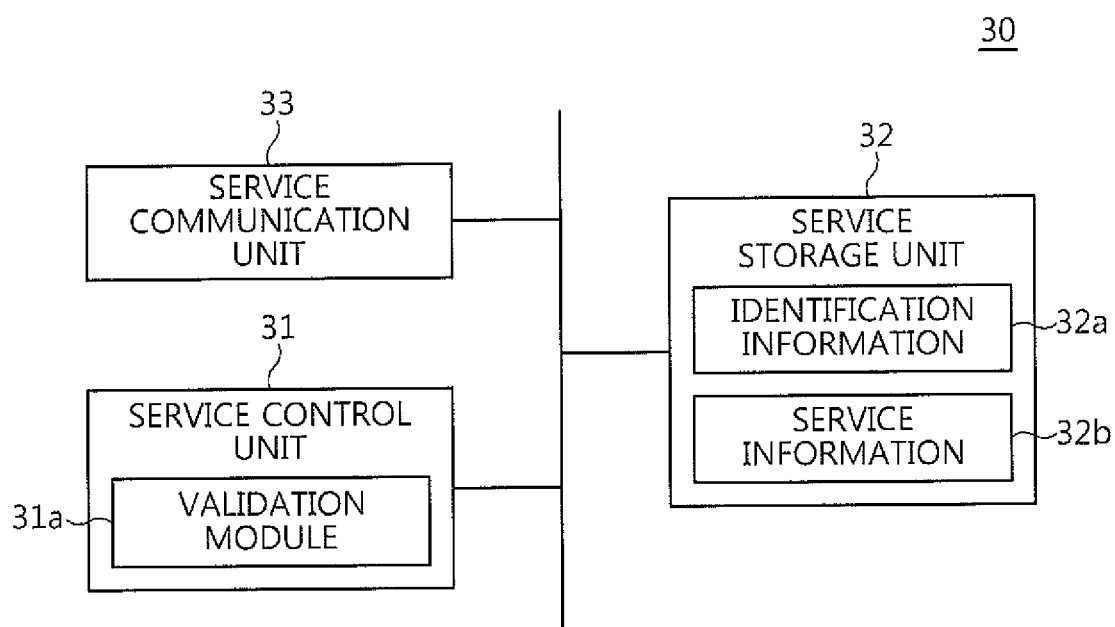
FIG. 5 is a block diagram illustrating the configuration of a service device according to an embodiment of the present invention.

FIG. 5 is a block diagram illustrating the configuration of a service device 30 according to an embodiment of the present invention.

Referring to FIG. 5, the service device 30 according to this embodiment of the present invention may include a service control unit 31, a service storage unit 32, and a service communication unit 33. In this case, the service control unit 31 includes a validation module 31a. The service storage unit 32 includes identification information 32a and service information 32b.

The service communication unit 33 communicates with the terminal 10 and the beacon device 20 over the communication network 40, and transmits and receives data applied to the enhancement of the security of the beacon device 20.

The service storage unit 32 stores all programs and data related to the execution of the function of the service device 30. In this case, the service storage unit 32 stores the identification information and the service information. In this case, the identification information is information generated through the combination of current time and an authentication key. The service information includes at least one of current location information, coupon information, discount information, and event information related to a corresponding store.

The service control unit 31 may be an OS and a process device configured to drive individual components. In particular, the service control unit 31 according to this embodiment of the present invention receives identification information from the beacon device 20. In this case, the service control unit 31 may communicate with the beacon device 20 over the communication network 40 and then receive the identification information.

The service control unit 31 receives the identification information from the terminal 10, and then performs the validation of the identification information received from the terminal 10 and the identification information received from the beacon device 20. In this case, the service control unit 31 determines whether the identification information received from the beacon device 20 matches the identification information received from the terminal 10, and performs the validation by taking into account the result of the determination. For example, the service control unit 31 checks an authentication key and time information included in the identification information received from the beacon device 20. The service control unit 31 decrypts the authentication key, and extracts matching time information. Similarly, the service control unit 31 checks an authentication key and time information included in the identification information received from the terminal 10. The service control unit 31 decrypts the authentication key, and extracts matching time information. Thereafter, the service control unit 31 compares the two decrypted authentication keys, thereby performing the validation of the identification information. In this case, the service control unit 31 may determine that the identification information is valid only when the two authentication keys are same.

The service control unit 31 extracts service information in response to the result of the validation when the validation is successful. In this case, the service information includes at least one of current location information, coupon information, discount information, and event information related to a corresponding store. Thereafter, the service control unit 31 transmits the extracted service information to the terminal 10.

Furthermore, the service device 30 configured as described above may be implemented as one or more servers that operate in a server-based computing-based manner or in a cloud manner. In particular, data required to enhance security via a beacon may be provided through a cloud computing function that can be permanently stored in a cloud computing device on the Internet. In this case, the term "cloud computing" refers to technology that serves virtualized Information Technology (IT) resources, for example, hardware (a server, a storage, a network, etc.), software (a database, security, a web server, etc), service, data, etc., to a digital terminal, such as a desktop, a tablet computer, a notebook, a netbook and a smartphone in an on-demand manner using internet technology.

Meanwhile, memory mounted on the terminal 10 and the service device 30 stores information within these devices. In an implementation, the memory is a medium that is readable by a computer. In an implementation, the memory may be a volatile memory unit. In another implementation, the memory may be a nonvolatile memory unit. In an implementation, a storage device is a medium that is readable by a computer. In various different implementations, the storage device may include, for example, a hard disk device, an optical disk device, or any other mass storage device.

Although exemplary device configurations are described and illustrated in the present specification and the drawings, various implementations of technologies described herein may be realized as other types of digital electronic circuitry, as computer hardware, firmware or software including structures disclosed herein and structural equivalents thereto, or as combinations thereof. Each of the various implementations of the subject matter described herein may be realized as one or more computer program products, i.e., one or more modules related to computer program instructions encoded on a computer-readable medium to control the operation of a device according to an embodiment of the present invention or to be executed by the device. The computer-readable medium may be a machine-readable storage device, a machine-readable storage substrate, a memory device, a material composition affecting machine-readable radio signals, or a combination thereof.

Figure 6:
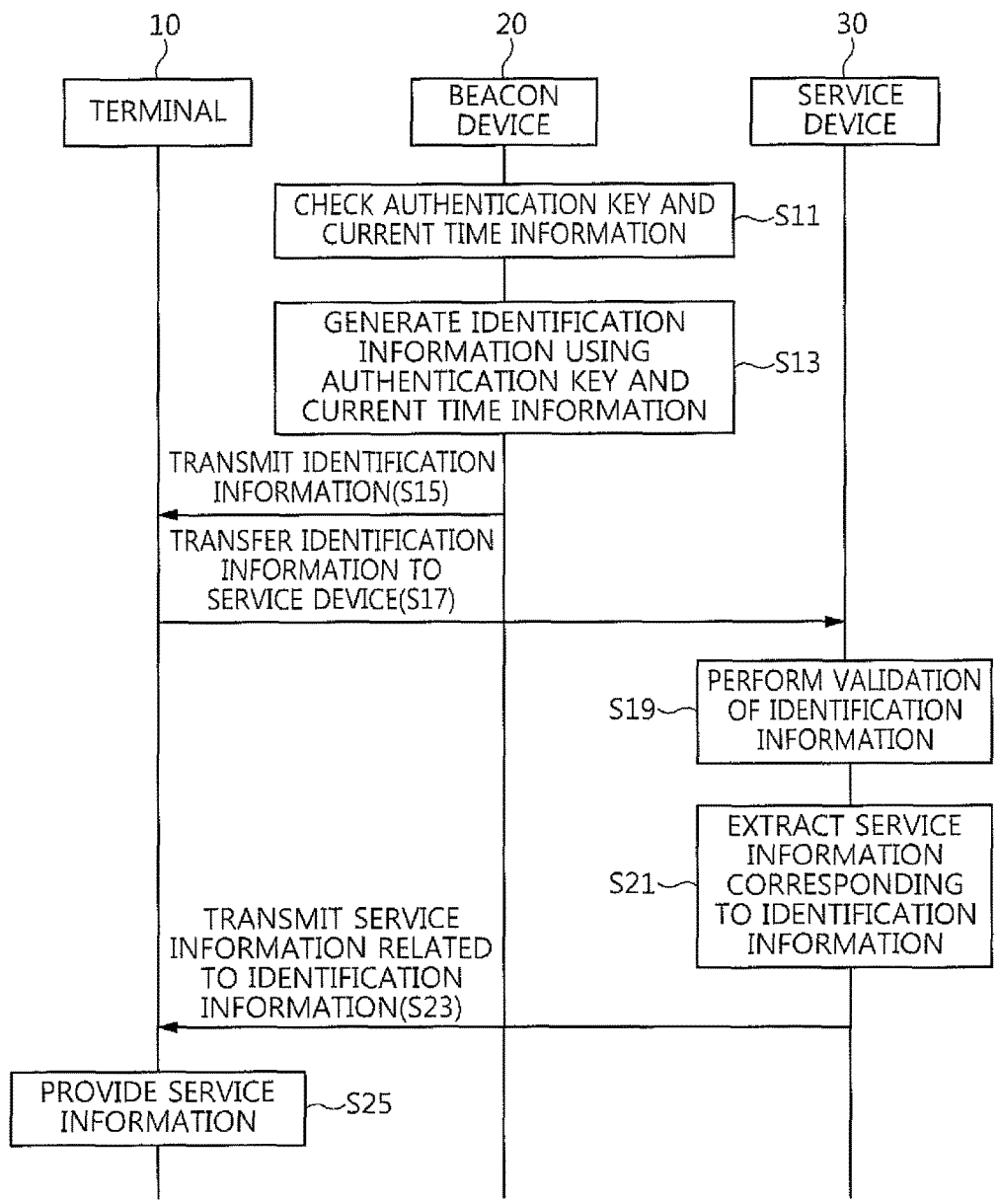
FIG. 6 is a diagram illustrating the flow of data that is used to enhance the security of the beacon device according to an embodiment of the present invention.

FIG. 6 is a diagram illustrating the flow of data that is used to enhance the security of the beacon device 20 according to an embodiment of the present invention.

Referring to FIG. 6, in the flow of data that is used to enhance the security of the beacon device 20 according to an embodiment of the present invention, the beacon device 20 checks an authentication key and current time information in order to enhance security at step S11. Thereafter, the beacon device 20 generates identification information using the authentication key and the current time information at step S13. Furthermore, the beacon device 20 performs an operation on the authentication key and the time information and then generates the identification information at predetermined time intervals. In this case, the identification information may be information that is generated through the combination of the authentication key and the time information. The authentication key may correspond to key information that has been set differently for each beacon device. The time information may be generated at predetermined regular time intervals. For example, the identification information may include a One-Time Password (OTP). A user authentication method using a one-time password of random numbers that are randomly generated is applied to the identification information. That is, the control module 21 generates a one-time password. The control module 21 may automatically generate a different password of a specific number of digits at predetermined time intervals.

At step S15, the beacon device 20 transmits identification information, generated in response to a request signal received from the terminal 10, to the terminal 10. In this case, the beacon device 20 transmits the identification information to the terminal 10 via short-range wireless communication. In this case, the beacon device 20 may be equipped with a Wi-Fi module and thus communicate with the terminal 10, and may communicate with the service device 30 over the communication network 40.

After receiving the identification information, the terminal 10 transfers the identification information, received from the beacon device 20, to the service device 30 at step S17.

At step S19, the service device 30 performs the validation of the identification information received from the terminal 10 and the identification information received from the beacon device 20. In this case, the service device 30 determines whether the identification information received from the beacon device 20 matches the identification information received from the terminal 10, and performs the validation by taking into account the result of the determination. For example, the service device 30 checks an authentication key and time information included in the identification information received from the beacon device 20. The service device 30 decrypts the authentication key, and extracts matching time information. Similarly, the service device 30 checks an authentication key and time information included in the identification information received from the terminal 10. The service device 30 decrypts the authentication key, and extracts matching time information. Thereafter, the service device 30 compares the two decrypted authentication keys, thereby performing the validation of the identification information. In this case, the service device 30 may determine that the identification information is valid only if the two authentication keys match each other.

At step S21, the service device 30 extracts service information in response to the result of the validation when the validation is successful. In this case, the service information includes at least one of current location information, coupon information, discount information, and event information related to a corresponding store. Thereafter, at step S23, the service device 30 transmits the extracted service information to the terminal 10.

After receiving the service information, the terminal 10 provides the received service information at step S25.

Accordingly, in accordance with an embodiment of the present invention, service can be used only in an application of an authenticated terminal through the dynamic assignment of identification information to a beacon device, thereby preventing the unauthorized use of the beacon device. Furthermore, the checking of the identification information of the beacon device is performed using a BLE beacon signal, and thus resources required for the checking of the identification information can be reduced on behalf of the terminal and also logic required for the extraction of information applied to the service can be simplified on behalf of the service device.

Figure 7:
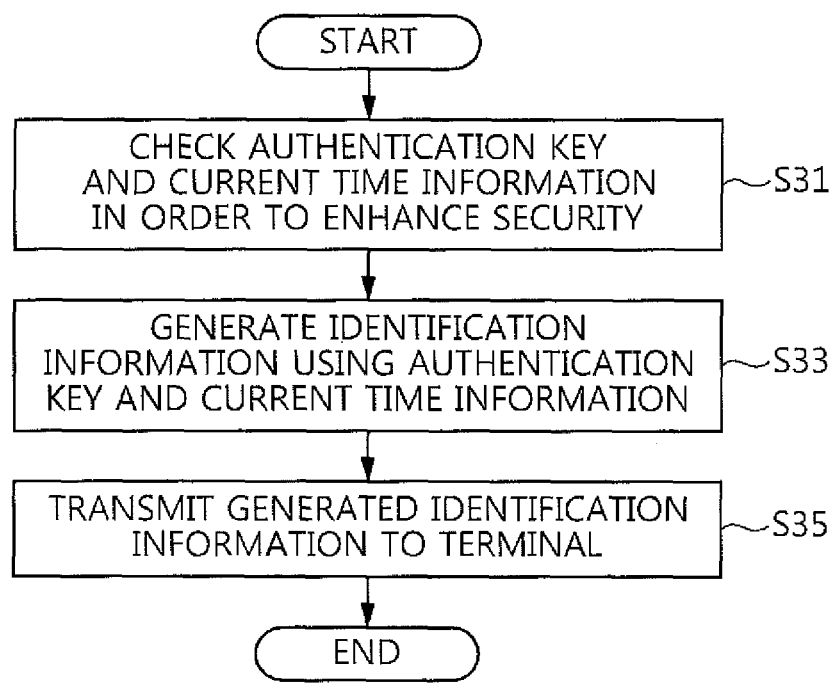
FIG. 7 is a flowchart illustrating a method of operating the beacon device according to an embodiment of the present invention.

FIG. 7 is a flowchart illustrating a method of operating the beacon device 20 according to an embodiment of the present invention.

Referring to FIG. 7, the beacon device 20 according to this embodiment of the present invention checks an authentication key and current time information in order to enhance security at step S31. Thereafter, the beacon device 20 generates identification information using the authentication key and the current time information at step S33. In this case, the beacon device 20 performs an operation on the authentication key and the time information, thereby generating the identification information at predetermined time intervals. For example, the identification information may include an OTP. A user authentication method using a one-time password of random numbers that are randomly generated is applied to the identification information. That is, the control module 21 generates a one-time password. The control module 21 may automatically generate a different password of a specific number of digits at predetermined time intervals.

At step S35, the beacon device 20 transmits identification information, generated in response to a request signal received from the terminal 10, to the terminal 10. In this case, the beacon device 20 transmits the identification information to the terminal 10 via short-range wireless communication. In this case, the beacon device 20 may be equipped with a Wi-Fi module and then communicate with the terminal 10.

Figure 8:
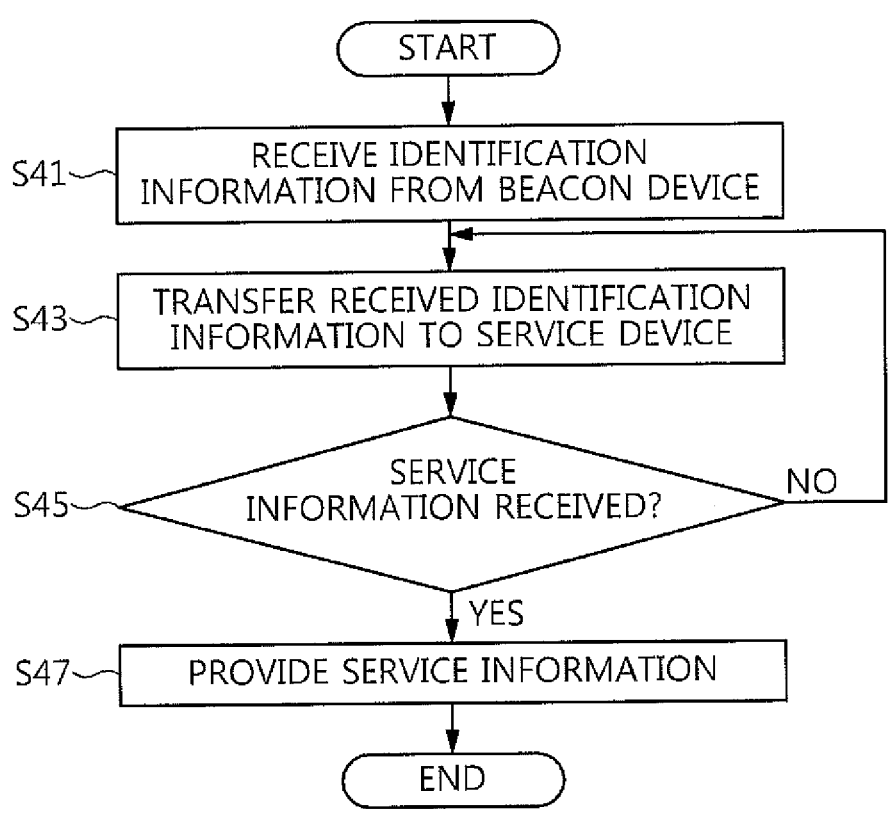
FIG. 8 is a flowchart illustrating a method of operating the terminal according to an embodiment of the present invention.

FIG. 8 is a flowchart illustrating a method of operating the terminal according to an embodiment of the present invention.

Referring to FIG. 8, the terminal 10 according to an embodiment of the present invention receives the identification information from the beacon device 20 at step S41. Thereafter, at step S43, the terminal 10 transfers the received identification information to the service device 30.

At step S45, the terminal 10 determines whether service information related to the identification information has been received by taking into account the result of the validation of the identification information received from the service device 30.

After receiving the service information, the terminal 10 provides the received service information at step S47. In this case, the service information includes at least one of current location information, coupon information, discount information, and event information related to a corresponding store.

Figure 9:
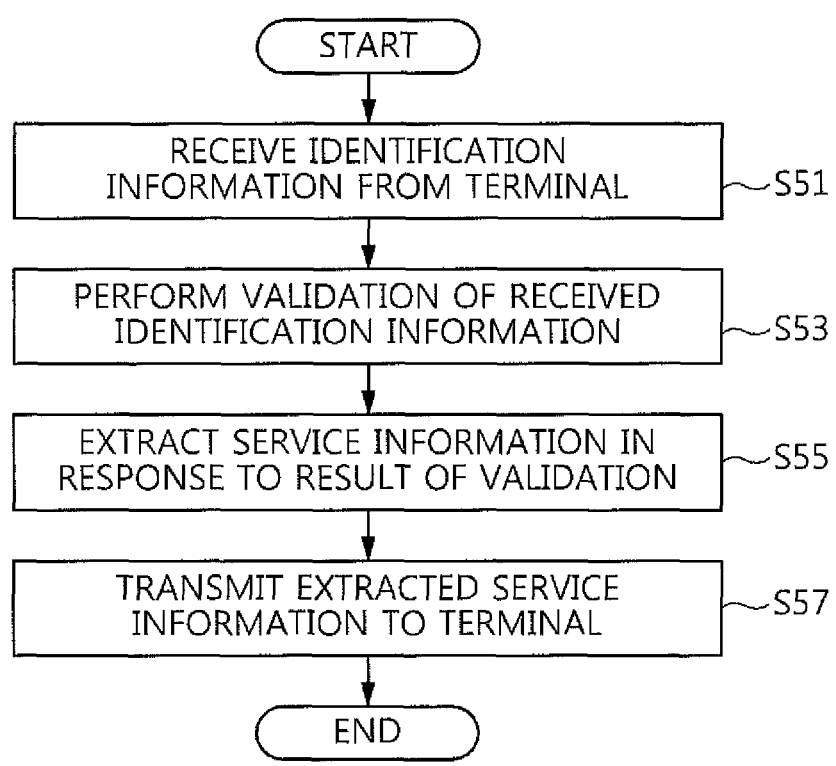
FIG. 9 is a flowchart illustrating a method of operating the service device according to an embodiment of the present invention.

FIG. 9 is a flowchart illustrating a method of operating the service device 30 according to an embodiment of the present invention.

Referring to FIG. 9, at step S51, the service device 30 according to an embodiment of the present invention receives identification information from the terminal 10. Furthermore, the service device 30 receives identification information from the beacon device 20.

At step S53, the service device 30 performs the validation of the identification information received from the terminal 10 and the identification information received from the beacon device 20. In this case, the service device 30 determines whether the identification information received from the beacon device 20 matches the identification information received from the terminal 10, and performs the validation by taking into account the result of the determination. That is, the service device 30 may check the received identification information, and then may perform the validation based on the times at which the identification information have been generated and whether authentication keys match each other.

At step S55, the service device 30 extracts service information in response to the result of the validation. Thereafter, at step S57, the service device 30 transmits the extracted service information to the terminal 10.

Various implementations of the technologies described herein may be realized as digital electronic circuitry, computer hardware, firmware, software, or combinations thereof. These various implementations may be realized as computer program products, i.e., information carriers (for example, machine-readable storage devices or computer programs tangibly embodied in radio signals), to perform processing through or control the operation of a data processing apparatus, for example, a programmable processor, a computer, or multiple computers. A computer program, such as each of the above-described computer programs, may be written in any type of programming language, including a compiled or interpreted language, and may be deployed in any form, including a stand-alone program, a module, a component, a subroutine, or any other unit suitable for use in a computing environment. The computer program may be deployed to be executed on one computer or on multiple computers at one site, or may be distributed across multiple sites and interconnected over a communication network.

The methodological steps described herein may be performed by one or more programmable processors that execute a computer program in order to perform functions by operating on-input data and generating output. The methodological steps may also be performed by special purpose logic circuitry, for example, a Field Programmable gate Array (FPGA) or an Application-Specific Integrated Circuit (ASIC), and the devices of the invention may be implemented as such circuitry.

Processors suitable for the execution of a computer program include, for example, both general and special purpose microprocessors and any one or more processors of any type of digital computer. Generally, a processor will receive instructions and data from a read-only memory, a random access memory, or both. The components of a computer may include at least one processor for executing instructions and one or more memory devices for storing instructions and data. Generally, a computer may include one or more mass storage devices for storing data, for example, magnetic, magneto-optical or optical disks, or may be operatively coupled to these mass storage devices in order to receive data from, transfer data to or perform both on these mass storage devices. Information carriers suitable for the embodiment of computer program instructions and data include, by way of example, semiconductor memory devices, for example: magnetic media, such as hard disks, floppy disks or magnetic tapes; optical media, such as CD-ROM and DVD-ROM; magneto-optical media, such as floptical disks; ROM; RAM; and flash memory. The processor and the memory may be supplemented with or incorporated into special purpose logic circuitry.

While the present specification contains many details of particular implementations, these should not be construed as limitations on the scope of the invention or what may be claimed, but, rather, should be construed as descriptions of features specific to particular embodiments of the invention. The particular features that are described herein in the context of separate embodiments may be also implemented in combination in a single embodiment. Conversely, the various features that are described in the context of a single embodiment may be also implemented in multiple separate embodiments or in any suitable sub-combinations. Moreover, although features may be described as operating in a certain combination and the certain combination may be claimed as such, one or more features of the claimed combination may be excluded from the combination in some cases, and the claimed combination may be changed to sub-combinations or variations of sub-combinations.

In the same manner, while operations have been described in a particular order in the drawings, this should not be construed as requiring that the operations should be performed in the described particular order or in a sequential order or that all the described operations should be performed in order to achieve desirable results. In some cases, multitasking and parallel processing may be advantageous.

Furthermore, the separation of various system components in the embodiments described above should not be construed as requiring such separation in all embodiments, and it should be appreciated that the described program components and systems may be generally integrated together in a single software product or packaged into multi-software products.

In accordance with the present disclosure, service can be used only in an application of an authenticated terminal through the dynamic assignment of identification information to a beacon device, thereby preventing the unauthorized use of the beacon device.

In accordance with the present disclosure, the checking of the identification information of the beacon device is performed using a BLE beacon signal, and thus resources required for the checking of the identification information can be reduced on behalf of the terminal and also logic required for the extraction of information applied to the service can be simplified on behalf of the service device.

The present disclosure is capable of dynamically changing identification information generated by the beacon device, thereby allowing service to be used only in an application of an authenticated terminal. Accordingly, service can be used only in an application of an authenticated terminal through the dynamic assignment of identification information to the beacon device, thereby preventing the unauthorized use of the beacon device. Furthermore, the checking of the identification information of the beacon device is performed using a BLE beacon signal, and thus resources required for the checking of the identification information can be reduced on behalf of the terminal and also logic required for the extraction of information applied to the service can be simplified on behalf of the service device. Furthermore, since the present invention has sufficient commercial potential or sales potential and can be practically and explicitly implemented, the present disclosure has industrial availability.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A non-transitory computer-readable storage medium having stored therein computer-readable program instructions that, when executed by a computer, cause the computer to execute a method of enhancing security, the method comprising:
   receiving identification information from at least one terminal;
   checking the received identification information, and performing validation based on (i) times at which pieces of identification information are generated and (ii) authentication keys included in the identification information;
   extracting at least one piece of service information in response to the validation; and
   transmitting the extracted service information to the at least one terminal,
   wherein the identification information is generated in a beacon device by a combination of an authentication key and time information, the authentication key corresponding to key information that is set differently for different beacon devices, the time information generated at predetermined regular time intervals, and
   wherein the identification information generated in the beacon device is sent to the at least one terminal.

2. The non-transitory computer-readable storage medium of claim 1, wherein the method further comprises:
   before receiving the identification information:
   receiving, by a service device, identification information from a beacon device; and
   storing, by the service device, the received identification information.

* * * * *